US010175396B2

(12) United States Patent
Stork et al.

(10) Patent No.: US 10,175,396 B2
(45) Date of Patent: Jan. 8, 2019

(54) ULTRA-MINIATURE WIDE-ANGLE LENSLESS CMOS VISUAL EDGE LOCALIZER

(71) Applicant: Rambus Inc., Sunnyvale, CA (US)

(72) Inventors: David Geoffrey Stork, Portola Valley, CA (US); Mehjabin Sultana Monjur, Evanston, IL (US); Leonidas Spinoulas, Chicago, IL (US); Patrick R. Gill, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 395 days.

(21) Appl. No.: 14/950,256

(22) Filed: Nov. 24, 2015

(65) Prior Publication Data

US 2016/0169667 A1 Jun. 16, 2016

Related U.S. Application Data

(60) Provisional application No. 62/090,823, filed on Dec. 11, 2014.

(51) Int. Cl.
*G02B 5/18* (2006.01)
*G02B 27/42* (2006.01)

(52) U.S. Cl.
CPC ....... *G02B 5/1876* (2013.01); *G02B 27/4255* (2013.01)

(58) Field of Classification Search
CPC .... G02B 5/1876; G02B 5/1842; G02B 5/189; G02B 5/18; G02B 5/188; G02B 5/1885; G02B 27/44; G01J 1/0414; G01J 3/021; G03F 7/70191; G01T 1/295; G01B 11/26
See application file for complete search history.

(56) References Cited

U.S. PATENT DOCUMENTS

| 4,504,147 A * | 3/1985 | Huang | G01J 9/0215 356/510 |
| 2011/0106472 A1* | 5/2011 | Seo | G01J 3/02 702/76 |
| 2013/0032734 A1 | 2/2013 | Santori et al. | |

(Continued)

FOREIGN PATENT DOCUMENTS

WO WO-2012/007561 A2 1/2012

OTHER PUBLICATIONS

Garcia-Martinez et al., "Generation of Bessel Beam Arrays Through Dammann Gratings", Mar. 20, 2012, vol. 51, No. 9, Applied Optics. pp. 1375-1381. 7 Pages.

(Continued)

*Primary Examiner* — Que T Le
*Assistant Examiner* — Jennifer Bennett
(74) *Attorney, Agent, or Firm* — Silicon Edge Law Group LLP; Arthur J. Behiel (57) ABSTRACT

Described are imaging systems that employ diffractive structures as focusing optics optimized to detect visual edges (e.g., slits or bars). The diffractive structures produce edge responses that are relatively insensitive to wavelength, and can thus be used to precisely measure edge position for panchromatic sources over a wide angle of view. Simple image processing can improve measurement precision. Field-angle measurements can be made without the aid of lenses, or the concomitant cost, bulk, and complexity.

13 Claims, 5 Drawing Sheets

(56) References Cited

U.S. PATENT DOCUMENTS

2013/0032914 A1\* 2/2013 Iwasaki ............ H01L 27/14621
257/432

OTHER PUBLICATIONS

Beynon, T.D., "Gabor zone plate with binary transmittance values", Optics Letters, vol. 17, No. 7, pp. 544-546, Apr. 1, 1992. 3 pages.

Cao, Qing et al., "Comprehensive focusing analysis of various Fresnel zone plates", J. Opt. Soc. Am. A., vol. 21, No. 4, pp. 561-571, Apr. 2004. 11 pages.

Chang, Soo, "Aberrations of a Gaussian laser beam focused by a zone plate", Optik—International Journal for Light and Electron Optics), Jan. 2013, 142(1):85-90. 6 pages.

Choy, C.M. et al, "High-efficiency cosine-approximated binary Gabor zone plate", Applied Optics, vol. 33, No. 5, pp. 794-799, Feb. 10, 1994. 6 pages.

Ding, Jianping, "Modified Binary Gabor Zone Plates", Optics Communications, 217 (2003), pp. 97-103. 7 pages.

Ferrando, Vicente et al., "Cantor Dust Zone Plates", Optics Express, vol. 21, No. 3, Feb. 11, 2013. 6 pages.

Furlan, Walter D., "White-light imaging with fractal zone plates", Optics Letters, vol. 32, No. 15, pp. 2109-2111, Aug. 1, 2007. 3 pages.

Gao, Nan et al., "Square Optical Vortices Generated by Binary Spiral Zone Plates", Applied Physics Letters 98, 151106 (2011). 4 pages.

Gill, Patrick et al., "Lensless Ultra-Miniature Imagers Using Odd-Symmetry Spiral Phase Gratings", article presented at Computational Optical Sensing and Imaging (COSI), Arlington, Virginia, Jun. 23-27, 2013. 3 pages.

Gill, Patrick et al., "Lensless Ultra-Miniature Imagers Using Odd-Symmetry Spiral Phase Gratings", slide deck presented at Computational Optical Sensing and Imaging (COSI), Arlington, Virginia, Jun. 23-27, 2013. 18 pages.

Gimenez, Fernando et al., "Fractal Photon Sieve", Optics Express, vol. 14, Issue 25, pp. 11958-11963, 2006. 6 pages.

Guerineau, N. et al., "Generation of Achromatic and Propagation-Invariant Spot Arrays by Use of Continuously Self-Imaging Gratings", vol. 26, No. 7, Apr. 1, 2001. 3 pages.

Horisaki, Ryoichi et al., "Regularized Image Reconstruction for Continuously Self-Imaging Gratings", vol. 52, No. 16, Jun. 1, 2013. 10 pages.

Kukkapalli, Pradyoth, "Creating Dark Lines in Space With Linear Zone Plates", Intel Science Talent Search (Physics), Nov. 2010. 20 pages.

Mendoza-Yero, Omel et al., "Fractal Generalized Zone Plates", Journal of the Optical Society of America A, vol. 26, Issue 5, pp. 1161-1166, 2009. 6 pages.

Monsoriu, Juan A., et al., "Focusing Light With Fractal Zone Plates", Recent Res. Devel. Optics, 5, 2005, pp. 1-15. 15 pages.

Piponnier, Martin et al., "Relevance of Continuously Self-Imaging Gratings for Noise Robust Imagery", vol. 37 No. 17, Sep. 1, 2012. 3 pages.

Saavedra, Genaro et al., "Fractal Zone Plates", Optics Letters, vol. 28, No. 12, pp. 971-973, Jun. 15, 2003. 3 pages.

Vijayakumar, A. et al., "Design, fabrication, and evaluation of a multilevel spiral-phase Fresnel zone plate for optical trapping", Applied Optics, vol. 51, No. 25, pp. 6038-6044, Sep. 1, 2012. 7 pages.

\* cited by examiner

ULTRA-MINIATURE WIDE-ANGLE LENSLESS CMOS VISUAL EDGE LOCALIZER

BACKGROUND

Optics can be thought of as performing mathematical operations transforming light intensities from different incident angles to locations on a two-dimensional image sensor. In the case of focusing optics, this transformation is the identity function: each angle is mapped to a distinct corresponding point on the sensor. When focusing optics are impractical due to size, cost, or material constraints, the right diffractive optic can perform an operation other than the identity function that is nonetheless useful to resolve image features of interest. In such cases the sensed data may bear little or no resemblance to the captured scene; however, a desired optical discrimination can still be resolved or computed from the sensor outputs.

Automated inspection often involves the visual determination of alignment of small parts or other visual tasks that require the accurate estimation of the position of a visual edge (e.g., a slit or bar). These applications may involve severe space constraints, especially if existing machines or devices are to be retro-fitted with such alignment estimators. Given these tight spatial constraints, the sensor should have wide angle-of-view. Low computational complexity, low cost, and ease of manufacturing of the sensor are desirable.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
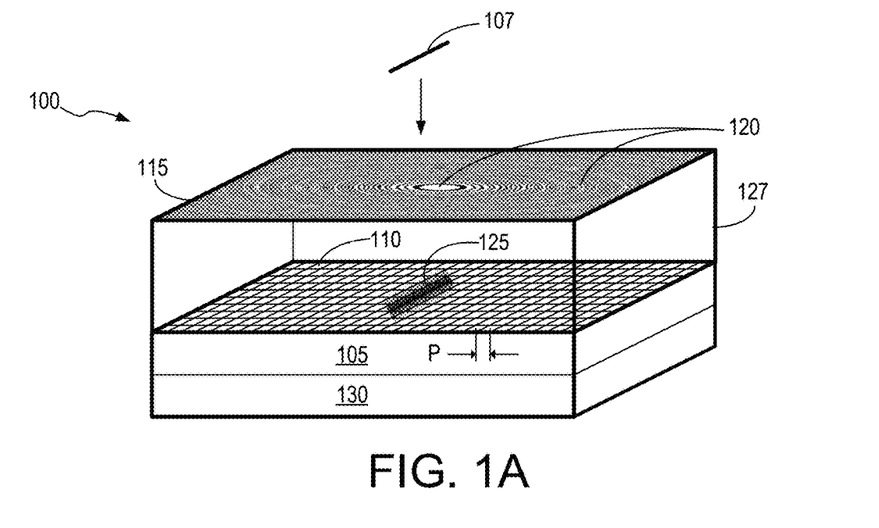
FIG. 1A depicts an imaging system 100 in accordance with one embodiment.

FIG. 1A depicts an imaging system 100 in accordance with one embodiment. System 100 includes an image sensor 105, a two-dimensional array of photosensitive pixels 110. A grating 115 overlying sensor 105 includes optical grating structures 120 that appear as concentric ellipses in this view. A line source of light 107, representative of e.g. a slit or edge of interest, shines (emits or reflects) panchromatic light toward grating 115. The light interacts with optical grating structures 120 to produce slit response 125 to the constituent wavelengths of the incident light 107. The position of response 125 on sensor 105 is a function of the incident angle of light 107, so system 100 can be used to measure the angle of incidence.

Image sensor 105 can be e.g. a charge-coupled device (CCD) or CMOS sensor, and may include an integrated processor 130 to manage, store, and process image data. The processor can be located remotely in other embodiments, or tasks can be divided between local and remote resources. The centers of pixels 110 are separated by a pitch P that in large part determines the resolution of system 100. Each photosensitive pixel 110 resolves a location of photon arrival. Light from diffractive structures 120 propagates through a light-transmissive medium 127, such as lanthanum dense flint glass. Other embodiments can include different grating-structure materials and material combinations. In some embodiments, for example, an air interface can be disposed between grating 115 and pixels 110. Sensor 105 is of the same area as grating 115 in this example, but sensor 105 can be larger or smaller than sensor 105 in other examples.

Figure 1B:
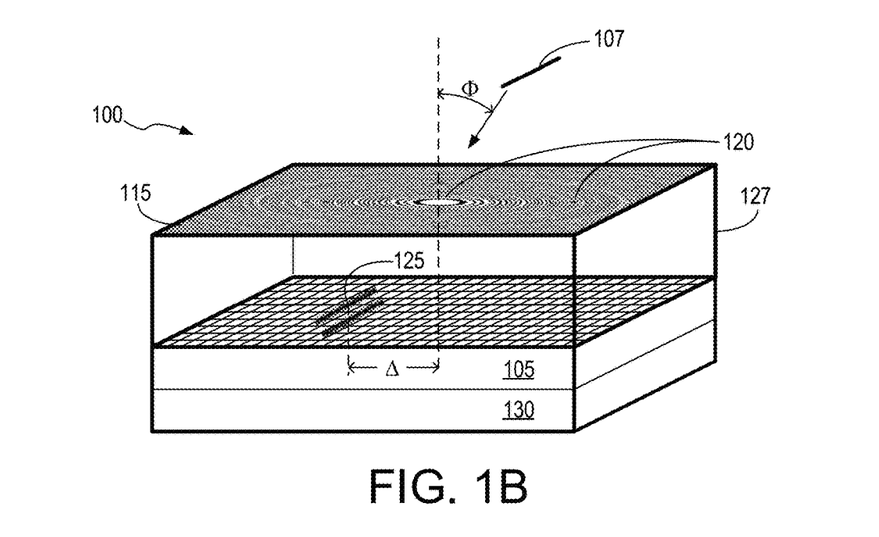
FIG. 1B depicts system 100 with light 107 moved to the right, causing response 125 to move to the left.

FIG. 1B depicts system 100 with light 107 moved to the right, causing response 125 to move to the left. The position of response 125 for light of normal incidence, shown in FIG. 1A, represents a zero reference against which displacement can be measured. In the example of FIG. 1B, the angular position of light 107 is off center by an incidence angle Φ of thirty degrees, which offsets the physical position of response 125 by a displacement distance A relative to the zero reference. The displacement distance can be measured in units of pixel pitch P, and can be correlated to incident angle Φ over a range of incident angles. The location of response 125 on sensor 105 can thus be used to measure the angle of incidence. For example, automatic inspection tools equipped with system 100 could align a part or parts with respect to a visual edge (e.g. slit or bar). System 100 performs such tasks without the cost, size, and complexity of focusing optics.

Grating 115 is designed to exhibit low wavelength dependence such that responses from different wavelengths of light are closely spaced over a broad range of incident angles. Assume, for example, that a light source includes both 450 nm light (blue) and 675 nm light (red), a difference of 150%, and that the angle of incidence is thirty degrees. Grating 115 produces responses to the blue and red wavelengths with main peaks that separated by less than three times the pixel pitch of array 105. In some embodiments the spacing of the main peaks is less than the pixel pitch. (Pixels 110, their pitch, and apparent separation of response 125 are relatively large here for ease of illustration. In one embodiment the pixel pitch is 0.05 microns) The close spacing of the main peaks attributed to different wavelengths at large angles of incidence supports accurate measurements of incident angle that is relatively insensitive to the wavelength on incident light.

Processor 130 can employ simple algorithms to improve on the displacement measurement, and thus to more accurately determine the angle of incidence. Several estimation procedures for the one-dimensional projections of raw data are a) maximum or mode of the signal distribution b) the maximum or mode of the smoothed distribution c) the absolute value of the gradient d) a Laplacian Gaussian operation e) the mean of a Gaussian. Exemplary procedures are detailed below. The incident angles of line sources of panchromatic or a discrete wavelength(s) can thus be measured with accuracy and precision. In some embodiments system 100 can resolve the angular position of a panchromatic light with a resolution of at most one pitch P.

Figure 1C:
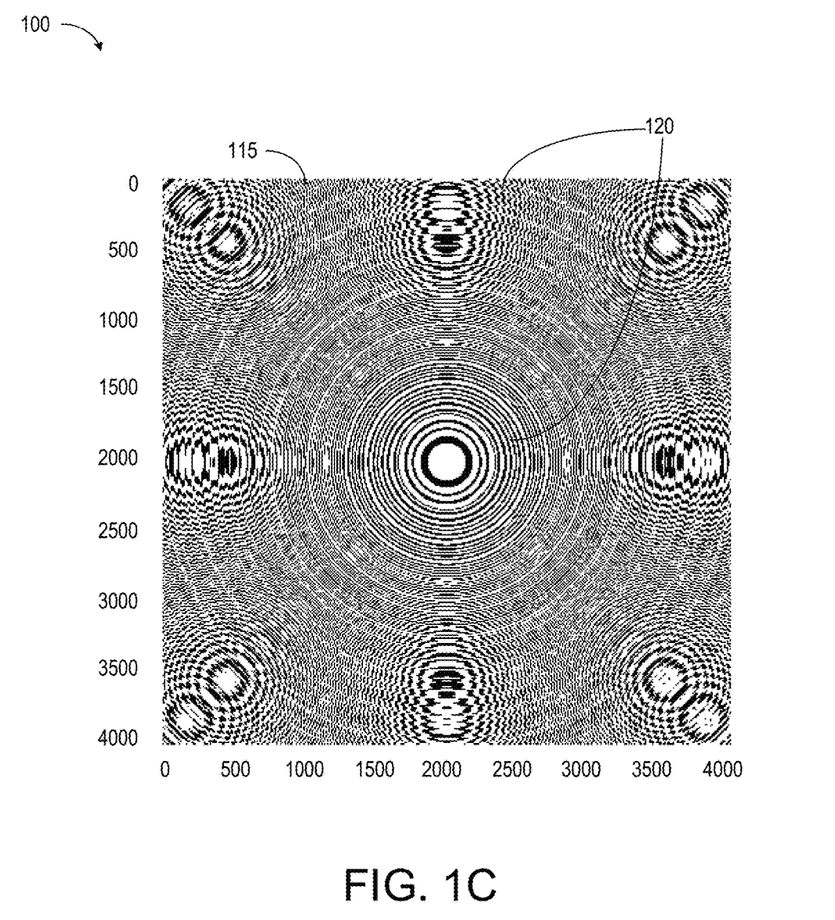
FIG. 1C depicts a Panchromatic Fresnel Zone Plate that can be used in system 100 as a grating 115.

FIG. 1C depicts a special type of amplitude grating 115 called a Panchromatic Fresnel Zone Plate (PFZP) that is capable of focusing light of three visible wavelengths to within a single pixel pitch over a wide range of incident angles. The pattern of structures 120, rings and their locations in this example, is derived by interfering three spectral components spanning the desired range of sensitivity of the sensor (e.g. red, green and blue light). The resulting equation of the phase is:

$$PFZP = |a + (jk_1/2\pi z_0)\exp(-jk_1(x^2+y^2))|^2 + |a + (jk_2/2\pi z_0)\exp(-jk_2(x^2+y^2))|^2 + |a + (jk_3/2\pi z_0)\exp(-jk_3(x^2+y^2))|^2 \quad [\text{eq. 1}]$$

where the $k_i$ are the wave numbers for the three wavelengths, a is a scale constant, and $z_0$ is a nominal scale factor analogous to the distance of a point source used in interference. Regions are made transparent where PZFP is above some threshold. Grating 115 contains all the common phases for focusing three wavelengths. Hence, the point spread functions of grating 115 for those three wavelengths overlap each other. Thus, zone plate 115 is capable of focusing panchromatic incident light to a desired primary position.

Figure 2:
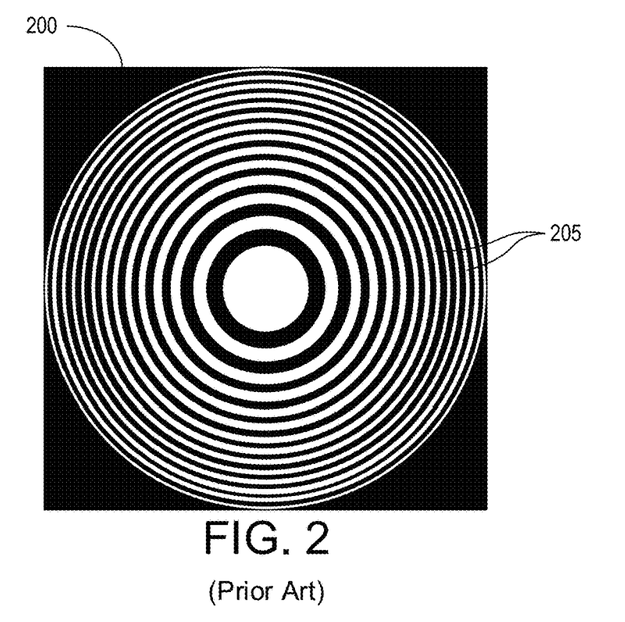
FIG. 2 (prior art) shows a plane view of a Fresnel zone plate 200, an amplitude grating in this example.

FIG. 2 (prior art) shows a plan view of a Fresnel zone plate 200, an amplitude grating in this example. Zone plate 200 includes rings 205, or "zones," that alternate between opaque and transparent with radially increasing line density and whose radii are proportional to the square root of the natural numbers.

Zone plate 200 is too wavelength sensitive to precisely locate a panchromatic line source. Like a prism, zone plate 200 causes light of different colors to be diffracted differently and to leave the plate at different angles, creating an effect similar to a rainbow. Lines of different colors would thus produce responses at different locations on an underlying pixel array, and panchromatic lines would produce responses that are spread out over the array. Either effect can produce errors or uncertainty such that the processor 130 would not be able to resolve the incident angle of e.g. a line source.

Returning to FIG. 1C, the pattern of diffractive structures 120 defined using equation 1 focuses light of three colors within a wavelength band of interest such that their respective responses are aligned on sensor 105. System 100 can thus be used to precisely measure the incident angle of panchromatic line sources, or line sources with wavelengths that vary over a band of interest. Integrated processor 130 can perform some relatively simple image processing on the raw image data from sensor 105 to further improve angular resolution.

Imaging system 100, and other embodiments, treat visual edge localization as a highly constrained task. The patterns of diffractive structures (e.g., structures 120) are derived to provide edge sensitivity, rather than more general imaging, and in doing so support edge localization using relatively simple inversion algorithms. As noted below, simple image processing of the sensor outputs can thus provide adequate resolution of incident angle. Accurate incidence-angle measurements can thus be provided without the aid of lenses, or the concomitant cost, bulk, and complexity.

Figure 3:
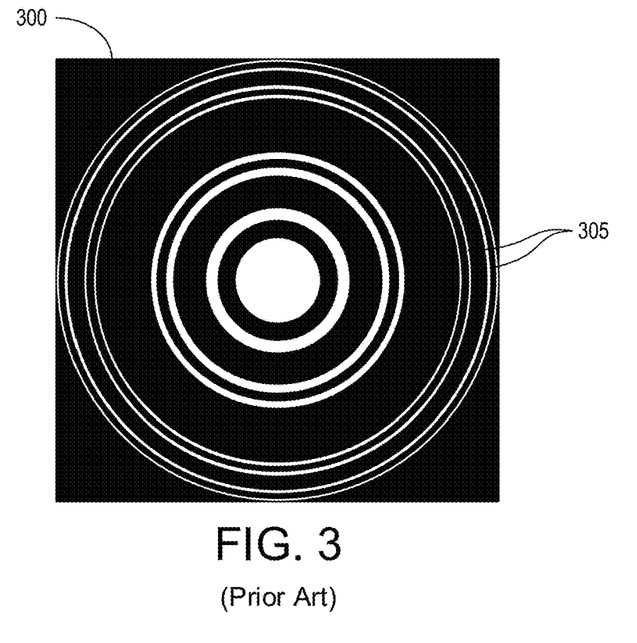
FIG. 3 (prior art) depicts a Fractal Fresnel phase plate 300 generated from a triadic Cantor set in accordance with another embodiment.

FIG. 3 (prior art) depicts a Fractal Fresnel phase plate 300 generated from a triadic Cantor set in accordance with another embodiment. Phase plate 300 can be formed by retaining only a Cantor-like set of rings 305 from an otherwise typical Fresnel plate (e.g., plate 200 of FIG. 2). As in the example of FIG. 2, white and black segments correspond to transmissive and opaque regions, respectively. For a more detailed discussion of Fresnel zone plates of the types depicted in FIGS. 2 and 3, see Saavedra, Genaro, Walter D. Furlan, and Juan A. Monsoriu, "Fractal zone plates," Optics letters Vol. 28, No. 12 (2003): 971-973, which is incorporated herein by reference.

Phase plate 300 can be used in place of grating 115 of FIGS. 1A and 1B in accordance with another embodiment. Phase plate 300 is like grating 115 of FIG. 1C in that it exhibits relatively low wavelength dependence over a wide range of incident angles. This characteristic can be used in the manner detailed previously to make systems for accurately measuring angles of incidence for e.g. panchromatic and discrete line sources.

Figure 4A:
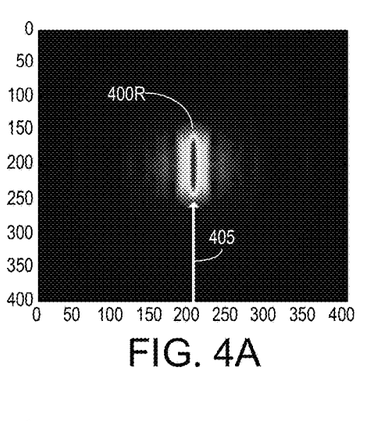
FIGS. 4A, 4B, and 4C are raw sensor signals that depict responses 400R, 400G, and 400B for red, green, and blue bars, respectively, for a slit source at 0° (centered) with respect to a sensor having a Fractal Fresnel phase plate 300 of the type detailed in connection with FIG. 3.
Figure 4B:
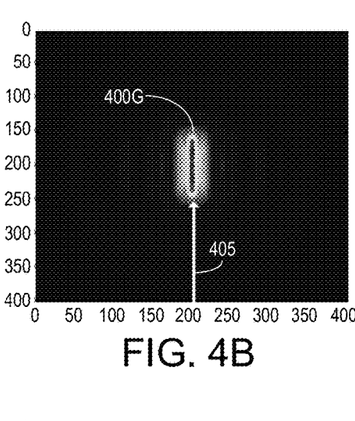
Figure 4C:
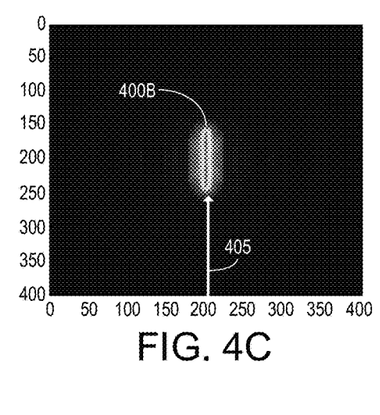

FIGS. 4A, 4B, and 4C are raw sensor signals that depict responses 400R, 400G, and 400B for red, green, and blue bars, respectively, for a slit source at 0° (centered, or of normal incidence) with respect to a sensor having a Fractal Fresnel phase plate 300 of the type detailed in connection with FIG. 3. This image data is taken using a sensor (not shown) that is 400 units square. An arrow 405 in each of FIGS. 4A, 4B, and 4C identifies the center of red response 400R (FIG. 4A) at a bit over 200 units from the left of the sensor. Arrows positioned at the same locus in FIGS. 4B and 4C show that the centers of responses 400G and 400B are aligned with that of red response 400R except that the shapes of the responses are slightly different. That is, the three responses 400R, 400G, and 400B are at essentially the same position but of slightly different shapes. Similar raw sensor signal responses can be obtained for a slit source at 0° (centered) with respect to a sensor having a Panchromatic Fresnel zone plate of the type detailed in connection with FIG. 1C.

Figure 5A:
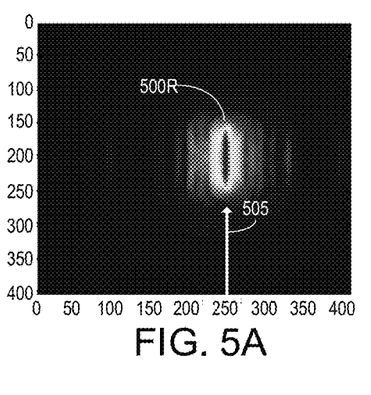
FIGS. 5A, 5B, and 5C are raw sensor signals that depict responses 500R, 500G, and 500B for red, green, and blue bars, respectively, for a slit source at +15° with respect to the same sensor and phase plate used to generate the data of FIGS. 4A-4C.
Figure 5B:
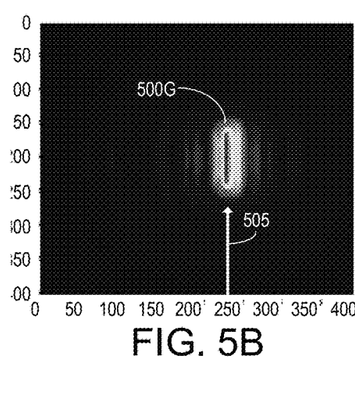
Figure 5C:
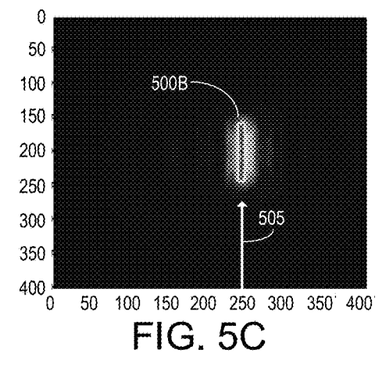

FIGS. 5A, 5B, and 5C are raw sensor signals that depict responses 500R, 500G, and 500B for red, green, and blue bars, respectively, for a slit source at +15° with respect to the same sensor and phase plate used to generate the data of FIGS. 4A-4C. An arrow 505 in each figure identifies the center of red response 400R of FIG. 5A at about 250 units from the left. Arrows positioned at the same locus in FIGS. 5B and 5C show that the centers of responses 500G and 500B are at the same position as 500R. That is, the three responses 500R, 500G, and 500B are located nearly at the same position on the image sensor and slightly different in shape. Again, a Panchromatic Fresnel zone plate of the type detailed in connection with FIG. 1C is also capable of producing similar wavelength independent raw sensor signal for a slit source at 15° with respect to a sensor. Thus, it is evident that the response of a bar created by Panchromatic Fresnel Zone Plate 115 and fractal Fresnel zone plate 300 is independent of wavelength.

For some applications, the level of resolution provided by raw sensor data is sufficient to measure angular displacement. For more exacting applications, relatively simple signal-processing algorithms can be performed via integrated processor 130 or elsewhere to further refine field-angle measurements, and thus more precisely locate a line source.

Figure 6:
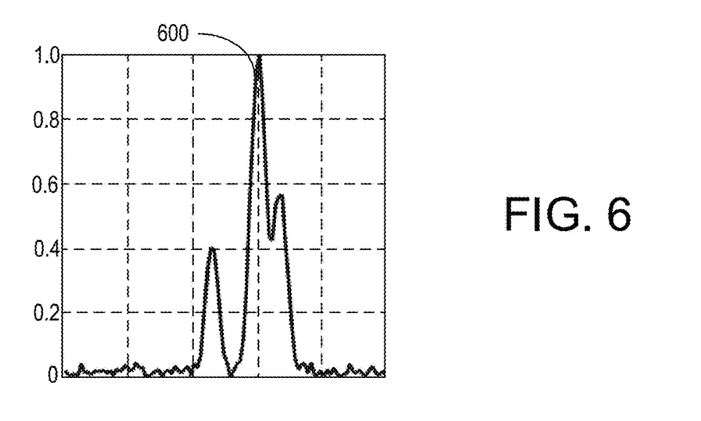
FIG. 6 depicts a panchromatic sensor response 600 vertically projected along the horizontal axis.

FIG. 6 depicts a panchromatic sensor response 600 vertically projected along the horizontal axis. Response 600 is obtained by capturing a panchromatic response similar to the monochromatic responses shown in FIGS. 4A-5C and summing the pixel intensities along each column of pixels. In this context, a "column" extends in the direction of the line source. The position of response 600 along the horizontal axis is a strong function of the incident angle of the images line source. The number, placement, and relative magnitudes of the peaks of response 600 also vary with wavelength and angle in a manner that can introduce measurement errors. The main peak of response 600 provides a relatively wavelength-independent measure of field angle over a wide range of incident angles if the optical grating structures of FIGS. 1C and 3 are used. Some embodiments produce sub-pixel-pitch displacement variations for wavelengths of panchromatic light over a range of plus or minus fifty degrees from normal incidence.

The grating structures of FIGS. 1C and 3 provide reasonably accurate panchromatic slit alignment so that angles can be measured simply by e.g. finding the main peak (maximum) of panchromatic response 600. The shapes of responses differ for different wavelengths, but the main peaks of different wavelengths are similarly displaced over broad ranges of incident angles. The response of the above mentioned optical gratings are such that processor 130 can resolve the field-angle correctly using some straightforward signal processing. For example, field-angle can be estimated using e.g. a lookup table or functional fit (e.g., hyperbolic tangent) of the raw sensor data response. Imaging systems in accordance with the foregoing embodiments can thus provide accurate and wavelength-insensitive measurements of incident angle with little computational overhead or the associated delay and power usage.

Figure 7:
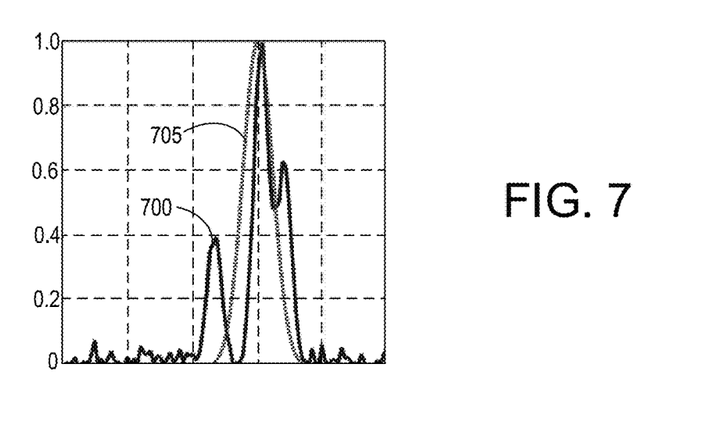
FIG. 7 depicts a raw panchromatic sensor response 700 and a Gaussian-fit response 705 of sensor response 700.

FIG. 7 depicts a raw panchromatic sensor response 700 and a Gaussian-fit response 705 of sensor response 700. In some examples the peak of Gaussian-fit response 705 may provide a more accurate angle measurement than the main peak of response 700. Gaussian-fit responses can be calculated using e.g. a Laplacian of a Gaussian operation or by taking the mean of a Gaussian whose mean and variance have been fit to the distribution minimizing a sum-squared error.

Figure 8:
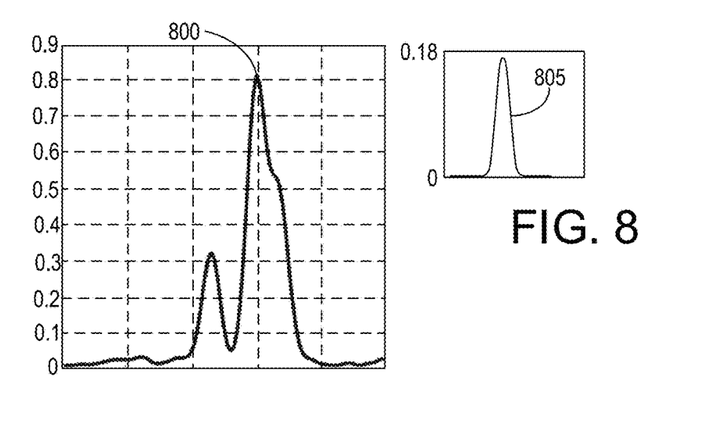
FIG. 8 depicts a panchromatic sensor response 800 that results from treating a raw response (not shown) to a smoothing function 805.

FIG. 8 depicts a panchromatic sensor response 800 that results from treating a raw response (not shown) to a smoothing function 805. Again, in some examples the peak of response 800 may provide a more accurate measurement than the peak of response 700.

Other methods of refining raw sensor responses include e g taking the absolute value of the gradient, which is likely to be shifted from the true center of the distribution. Estimators for panchromatic responses can have the following properties: a) test wavelengths (e.g., red, green, and blue) agree throughout the field of view, b) the sensor position is a monotonic function of incident angle (invertibility), c) the response is anti-symmetric about the center or 0° (symmetry), d) the slope is as large as possible throughout the entire range (high localization accuracy), and e) a wide field of view While the subject matter has been described in connection with specific embodiments, other embodiments are also envisioned. For example, some embodiments may use special materials, such as nano-particle-infused transparent media, and gratings of the type detailed above can be phase gratings, amplitude gratings, or a combination of the two. Still other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. An imaging system comprising:
   an array of photosensitive pixels having pixel centers separated by a pixel pitch;
   optical grating structures defining a surface overlying the array and shining slit responses on the array for capture by the array, the slit responses for a line source of light having a wavelength band encompassing a first wavelength and a second wavelength at least 150% of the first wavelength, the slit responses including a first multi-peak response to the light of the first wavelength and a second multi-peak response to the light of the second wavelength, the first multi-peak response including a first main peak and the second multi-peak response including a second main peak;
   wherein, for the light incident the grating structures at an angle of thirty degrees from an axis normal to the surface, the first main peak is separated from the second main peak by less than three times the pixel pitch; and
   a processor to process the captured first multi-peak response and the captured second multi-peak response to locate at least one of the first main peak and the second main peak, and to calculate an incident angle of the light from at least one of the first multi-peak response and the second multi-peak response.

2. The imaging system of claim 1, wherein the processor is integrated with the array of photosensitive pixels.

3. The imaging system of claim 1, the processor to calculate a first one-dimensional projection of the first multi-peak response and a second one-dimensional projection of the second multi-peak response.

4. The imaging system of claim 3, wherein the first and second one-dimensional projections are along a direction perpendicular to the line source.

5. The imaging system of claim 1, wherein the first main peak is separated from the second main peak by less than the pixel pitch.

6. The imaging system of claim 1, wherein the grating structures define a Fractal Fresnel zone plate.

7. The imaging system of claim 1, wherein the grating structures define at least one of a phase grating and an amplitude grating.

8. The imaging system of claim 1, wherein the light of the first wavelength is blue and the light of the second wavelength is red.

9. The imaging system of claim 1, wherein the grating structures comprise a Panchromatic Fresnel zone plate.

10. The imaging system of claim 1, wherein the grating structures comprise rings and locations specified according to an interference of a plane wave and a point source of a mixture of wavelengths.

11. A method of measuring an angle of incidence for a line source of light having a wavelength band encompassing a first wavelength and a second wavelength at least 150% of the first wavelength, the method comprising:
   passing the light through optical grating structures defining a surface overlying an array of pixels to shine a slit response on the array of pixels, the slit response including a first peak for the light of the first wavelength and a second peak for light of the second wavelength;
   wherein, for the light incident the grating structures at an angle of thirty degrees from an axis normal to the surface, the first peak overlaps the second peak;

capturing an image of the overlapping first peak and second peak; and processing the image to calculate the angle of incidence.

12. The method of claim 11, wherein the first peak for the light of the first wavelength is a main peak of a first multi-peak response and the second peak for the light of the second wavelength is a main peak of a second multi-peak response.

13. The method of claim 12, wherein the array of pixels is of a pixel pitch and, for the light incident the grating structures at the angle of thirty degrees from the axis normal to the surface, the first main peak is separated from the second main peak by less than the pixel pitch.

* * * * *